(12) United States Patent
Ohtsuka et al.

(10) Patent No.: US 6,410,477 B1
(45) Date of Patent: Jun. 25, 2002

(54) HYDROGENATION CATALYST OF CARBON MONOXIDE AND METHOD OF MANUFACTURING HYDROGENATION PRODUCT

(75) Inventors: Yasuo Ohtsuka; Muneyoshi Yamada; Ye Wang, all of Sendai (JP)

(73) Assignee: President of Tohoku University, Sendai (JP)

( * ) Notice: Subject to any disclaimer, the term of this patent is extended or adjusted under 35 U.S.C. 154(b) by 0 days.

(21) Appl. No.: 09/657,905

(22) Filed: Sep. 8, 2000

(30) Foreign Application Priority Data

Mar. 9, 2000 (JP) .......................................... 2000-064874

(51) Int. Cl.$^7$ ............................. B01J 21/08; B01J 21/12; B01J 21/14; C07C 27/00; C07B 63/02
(52) U.S. Cl. ...................... 502/240; 502/241; 502/242; 502/243; 502/246; 502/254; 502/255; 502/256; 502/257; 502/258; 518/713; 518/714; 518/715; 518/726
(58) Field of Search ................................ 502/308, 313, 502/315–319, 324–326, 330, 331, 333, 339, 345, 347, 344, 349, 240–245, 254, 256–262

(56) References Cited

U.S. PATENT DOCUMENTS

| | | | | |
|---|---|---|---|---|
| 4,431,574 A | * | 2/1984 | Bournonville et al. ...... 502/261 |
| 4,752,622 A | * | 6/1988 | Stevens ...................... 518/714 |
| 4,801,620 A | * | 1/1989 | Fujitani et al. ............. 518/715 |
| 5,164,351 A | * | 11/1992 | Steinbach et al. ............ 502/74 |
| 5,506,273 A | * | 4/1996 | Haruta et al. ............... 518/713 |
| 5,538,931 A | * | 7/1996 | Heinrichs et al. ........... 502/234 |
| 5,710,093 A | * | 1/1998 | Rivas et al. ................. 502/439 |
| 5,895,770 A | * | 4/1999 | Pullukat et al. ............. 502/103 |
| 6,110,856 A | * | 8/2000 | Flick et al. .................... 502/31 |

OTHER PUBLICATIONS

"Summary of 77th Autumn Annual Meeting of Japanese Chemical Society", 7 pages, Sep. 10, 1999.

* cited by examiner

Primary Examiner—Mark L. Bell
Assistant Examiner—Patricia L. Hailey
(74) Attorney, Agent, or Firm—Oblon, Spivak, McClelland, Maier & Neustadt, P.C.

(57) ABSTRACT

Provided is a hydrogenation catalyst of carbon monoxide, which is suited to the manufacture of a hydrogenation product containing target components (e.g., gasoline fuel oil components or diesel fuel oil components) at high selectivity from a gas mixture of hydrogen and carbon monoxide. This hydrogenation catalyst of carbon monoxide has a structure in which a transition metal is carried by a porous material in which 90% or more of all pores are fine pores each having a diameter of 1 to 50 nm.

9 Claims, No Drawings

HYDROGENATION CATALYST OF CARBON MONOXIDE AND METHOD OF MANUFACTURING HYDROGENATION PRODUCT

CROSS-REFERENCE TO RELATED APPLICATIONS

This application is based upon and claims the benefit of priority from the prior Japanese Patent Application No. 2000-064874, filed Mar. 9, 2000, the entire contents of which are incorporated herein by reference.

BACKGROUND OF THE INVENTION

The present invention relates to a hydrogenation catalyst of carbon monoxide and a method of manufacturing a hydrogenation product primarily containing gasoline fuel oil and diesel fuel oil.

Fuel oil manufactured from a gas mixture (synthetic gas) of carbon monoxide and hydrogen does not contain sulfur which forms sulfur oxide and aromatic hydrocarbon (aromatic) which generates soot and is carcinogenic, unlike fuel oil refined from petroleum. Hence, this type of fuel oil is attracting attention as low-environmental-load, high-quality fuel replacing petroleum fuel.

A hydrogenation product containing the above fuel oil component is conventionally manufactured by reacting the synthetic gas described above at a predetermined temperature and a predetermined pressure in the presence of a catalyst which is formed by causing silica or alumina to carry cobalt or iron. However, this method is not necessarily satisfactory in the manufacture of target components (e.g., gasoline fuel oil components or diesel fuel oil components) at higher selectivity than other components (e.g., methane).

BRIEF SUMMARY OF THE INVENTION

It is an object of the present invention to provide a hydrogenation catalyst of carbon monoxide, which is suited to the manufacture of a hydrogenation product containing target components (e.g., gasoline fuel oil components or diesel fuel oil components) at high selectivity from a gas mixture of hydrogen and carbon monoxide.

It is another object of the present invention to provide a method of manufacturing a hydrogenation product, capable of manufacturing a hydrogenation product containing target components (e.g., gasoline fuel oil components or diesel fuel oil components) at high selectivity from a gas mixture of hydrogen and carbon monoxide.

According to the present invention, there is provided a hydrogenation catalyst of carbon monoxide, comprising a transition metal and a porous material carrying the transition metal, the porous material having pores, 90% or more of which are fine pores each having a diameter of 1 to 50 nm.

According to the present invention, there is provided a method of manufacturing a hydrogenation product, comprising reacting a gas mixture containing carbon monoxide and hydrogen at a temperature of 200 to 400° C. and a pressure of 0.1 to 10 MPa in the presence of a catalyst in which a transition metal is carried by a porous material in which 90% or more of all pores are fine pores each having a diameter of 1 to 50 nm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

The present invention will be described in detail below.

A hydrogenation catalyst of carbon monoxide according to the present invention has a structure in which a transition metal or a noble metal is carried by a porous material in which 90% or more of all pores are fine pores each having a diameter of 1 to 50 nm.

This porous material is made of pure silica or a material formed by introducing a metal such as aluminum or gallium to pure silica as a base.

The "pore diameter" is the peak top of the distribution of pore diameters measured.

By defining the dimensions of fine pores and the fine pore distribution of the porous material within the above ranges, the transition metal can be carried as it is kept fine and uniformly dispersed. It is preferable that 90% or more of all pores in the porous material are fine pores each having a diameter of 1 to 10 nm. Known examples of this silica porous material include MCM-41 developed by Mobil Oil, FSM-16 developed by Tokyo University and Toyota Central Laboratory, and SBA-15 developed by Stanford University. MCM-41 is manufactured, for example, by hydrothermally synthesizing sodium silicate and hexadecyltrimethylammoniumbromide as a silica source and a surfactant (template), respectively, at 120° C. in a pressure reaction vessel (autoclave).

As the transition metal, it is possible to use cobalt, nickel, iron, copper, chromium, manganese, zirconium, molybdenum, tungsten, rhenium, osmium, iridium, palladium. silver, ruthenium, rhodium, gold, and platinum. Cobalt, iron, ruthenium, rhodium, and platinum are particularly preferable.

When the transition metal is cobalt or iron, this transition metal is preferably loaded within the range of 5 to 40 wt % by the porous material. When the transition metal is a noble metal selected from ruthenium, rhodium, and platinum, this transition metal is preferably loaded within the range of 1 to 15 wt % by the porous material. If the loaded amount of the transition metal is less than the lower-limit value of the above range, during the reaction of a gas mixture of hydrogen and carbon monoxide the conversion (to be described later) of carbon monoxide may decrease. On the other hand, if the loaded amount of the transition metal exceeds the upper-limit value of the above range, the conversion of carbon monoxide corresponding to this loaded amount cannot be expected.

The aforesaid hydrogenation catalyst of carbon monoxide is manufactured by, e.g., the IMP method or the TIE method described below.

(IMP method)

First, a porous material such as MCM-41 is air-calcined to remove any residual surfactant (template) by burning at a temperature of 500 to 600° C. Subsequently, the calcined porous material is dipped into an aqueous solution of a transition metal compound and impregnated with this aqueous solution. After that, the porous material is again dried and calcined at a temperature of 500 to 600° C. to manufacture a target catalyst.

(TIE method)

First, a porous material such as uncalcined MCM-41 is added to an aqueous solution of a transition metal compound, and the porous material and the aqueous solution are mixed. Since some surfactant (template) remains in the porous material, transition metal ions and template ions are exchanged. Subsequently, the mixture is dried and calcined at a temperature of 500 to 600° C. to remove the template by burning, thereby manufacturing a target catalyst.

Of the above hydrogenation catalyst manufacturing methods, in a catalyst formed by the TIE method, pores of the porous material do not collapse in the step of carrying the transition metal, and pores within a predetermined range are regularly arranged. That is, a catalyst formed by this TIE method is preferable in that it can carry a large amount of transition metal while the pore structure of the porous material before the transition metal is loaded is maintained.

A method of manufacturing a hydrogenation product according to the present invention will be described below.

In the presence of the above-mentioned catalyst in which a transition metal is carried by a porous material in which 90% or more of all pores are fine pores each having a diameter of 1 to 50 nm, a gas mixture of hydrogen and carbon monoxide is reacted at a temperature of 200 to 400° C. and a pressure of 0.1 to 10 MPa to manufacture a hydrogenation product containing gasoline fuel oil components or diesel fuel oil components.

More specifically, the catalyst in the form of, e.g., a powder is packed into a cylindrical stainless-steel high-pressure reaction tube, and this reaction tube is heated by a heater placed outside the reaction tube such that the internal temperature of the tube is 200 to 400° C. In this state, a high-pressure gas mixture (0.1 to 10 MPa) of hydrogen and carbon monoxide is supplied to manufacture a hydrogenation product.

Alternatively, a slurry formed by dispersing the powdery catalyst in a high-boiling organic solvent is placed in a high-pressure tank having an entrance and exit. While this high-pressure tank is heated by a heater placed outside the tank such that the internal temperature of the tank is 200 to 400° C., a high-pressure gas mixture (0.1 to 10 MPa) containing hydrogen and carbon monoxide is supplied into the slurry from the entrance. A hydrogenation product can also be manufactured by this method.

The catalyst can be used in the form of a powder (e.g., the average grain size is 50 to 150 $\mu$m) or granules formed by pulverizing pellets obtained by molding the powder.

The component ratio of the gas mixture cannot be unconditionally defined because it depends on the type of target component selected in a hydrogenation product.

Generally, the ratio of hydrogen ($H_2$): carbon monoxide (CO) is preferably 1:1 to 4:1. For example, when the component to be selected is a diesel fuel oil component, the mixing ratio of hydrogen ($H_2$): carbon monoxide (CO) in the gas mixture is preferably 2:1.

In a reaction system for reacting the gas mixture in the presence of the catalyst, by setting the temperature and the pressure within the above ranges it is possible to arbitrarily select, as target components, methane $C_1$ to butane $C_4$, gasoline fuel oil components $C_5$ to $C_9$, diesel fuel oil components $C_{10}$ to $C_{20}$, and high-boiling paraffin such as wax.

The flow rate when the gas mixture is supplied to the high-pressure reaction tube has influence on the conversion of carbon monoxide. Generally, the lower the flow rate of the gas mixture the higher the conversion of carbon monoxide. However, the distribution of each component of a hydrogenation product manufactured also changes, and this changes the yield of target components. Hence, to increase the yield of target components, i.e., to increase the selectivity, the flow rate of the gas mixture is preferably 50 to 100 $cm^3$/min at 0.1 MPa and 20° C.

As described above, a hydrogenation catalyst of carbon monoxide according to the present invention has a structure in which a transition metal is loaded by a porous material in which 90% or more of all pores are fine pores each having a diameter of 1 to 50 nm.

In a catalyst having this structure, pores of the porous material on which the transition metal is loaded are very fine, and the pore distribution is very narrow. Therefore, this catalyst is suited to the manufacture of a hydrogenation product containing target components (e.g., gasoline fuel oil components or diesel fuel oil components) at high selectivity from a gas mixture of hydrogen and carbon monoxide.

In particular, a catalyst formed by the TIE method described previously can hold a large amount of transition metal while the pore structure of a porous material before the transition metal is carried is maintained. Hence, this catalyst is suited to the manufacture of a hydrogenation product containing target components (e.g., gasoline fuel oil components or diesel fuel oil components) at higher selectivity.

Also, by defining the loaded amount of the transition metal (5 to 40 wt % in the case of cobalt, 1 to 15 wt % in the case of ruthenium), during the reaction of a gas mixture of hydrogen and carbon monoxide the conversion of carbon monoxide can be improved. In addition, it is possible to manufacture a hydrogenation product containing target components (e.g., gasoline fuel oil components or diesel fuel oil components) at higher selectivity.

Furthermore, in the method of manufacturing a hydrogenation product according to the present invention, in the presence of the aforesaid catalyst a gas mixture of hydrogen and carbon monoxide is reacted at a temperature of 200 to 400° C. and a pressure of 0.1 to 10 MPa.

This method uses the catalyst in which a transition metal is carried by a porous material in which pores are very fine and the pore distribution is very narrow. Therefore, the activating action of the transition metal present in a large number of very fine pores allows easy progress of the reaction from a gas mixture of hydrogen and carbon monoxide to target components, particularly gasoline fuel oil components $C_5$ to $C_9$ and diesel fuel oil components $C_{10}$ to $C_{20}$. Consequently, a hydrogenation product containing large amounts of these components can be manufactured.

In particular, when the gas mixture is reacted at a predetermined temperature and a predetermined pressure by using a catalyst formed by the TIE method and carrying a large amount of transition metal while the pore structure of a porous material before the transition metal is carried is maintained, it is possible to manufacture a hydrogenation product containing target components (e.g., gasoline fuel oil components or diesel fuel oil components) at higher selectivity. This is caused by the following behavior.

The selectivity of a hydrogenation product when hydrogen and carbon monoxide react with each other depends upon the carbon chain growth probability. In a catalyst formed by the TIE method, the active sites of a transition metal carried are present inside pores. Therefore, the reaction of the gas mixture progresses primarily inside those pores. This encourages an intermediate product generated by the reaction of the gas mixture to again adsorb on the active sites. So, the carbon chain growth probability efficiently increases. Accordingly, it is possible to manufacture a hydrogenation product containing gasoline fuel oil components $C_5$ to $C_9$ and diesel fuel oil components $C_{10}$ to $C_{20}$, each having a large number of carbon atoms, at higher selectivity.

The present invention will be described in more detail below by way of its preferred examples.

EXAMPLE 1

First, a silica porous material in which 91% of all pores were fine pores each having a diameter of 1 to 9 nm was calcined at a temperature of 550° C. to remove any residual surfactant (template) in the silica porous material by burning. Subsequently, this porous material was dipped into an aqueous cobalt nitrate solution with a concentration of 5 wt % and impregnated with this aqueous solution. After that, the porous material was again calcined at a temperature of 550° C. By this IMP method, a powdery catalyst carrying 10 wt % of cobalt and having an average grain size of 75 μm was manufactured.

The obtained powdery catalyst was packed into a cylindrical stainless-steel high-pressure reaction tube. This reaction tube was heated by a heater placed outside the reaction tube such that the internal temperature of the tube was 250° C. In this state, a high-pressure gas mixture (pressure; 2.0 MPa, $H_2$:CO=2:1) of hydrogen and carbon monoxide was supplied at a flow rate of 50 cm$^3$/min to manufacture a hydrogenation product.

EXAMPLE 2

First, a silica porous material in which 91% of all pores were fine pores each having a diameter of 1 to 9 nm was added to an aqueous cobalt nitrate solution with a concentration of 5 wt %, and the silica porous material and the aqueous solution were mixed to exchange any residual surfactant (template) in the silica porous material with Co ions. Subsequently, the mixture was dried and calcined at a temperature of 550° C. to remove the template by burning. By this TIE method, a powdery catalyst having an average grain size of 75 μm was manufactured. This catalyst carried 10 wt % of cobalt, and the silica porous material maintained a fine structure before it carried cobalt.

The obtained powdery catalyst was used to manufacture a hydrogenation product following the same procedure as in Example 1.

EXAMPLE 3

A hydrogenation product was manufactured following the same procedures as in Example 1 with a catalyst, formed by the TIE method, in which 20 wt % of Co is loaded on a silica porous material in which 91% of all pores were fine pores each having a diameter of 1 to 9 nm.

In Examples 1 to 3, the conversion of each obtained hydrogenation product with respect to carbon monoxide (CO) in the gas mixture and the components of the hydrogenation product were examined. The results are shown in Table 1 below. Components from methane $C_1$ to butane $C_4$ were analyzed by using a high-speed gas chromatograph (M200 (trade name); manufactured by Hewlett-Packard). Liquid components from $C_5$ were analyzed by using a gas chromatograph mass analyzer (Turbo Mass (trade name); manufactured by Perkin Elmer).

TABLE 1

| | Amount of Co loaded (wt %) | CO conversion (%) | Selectivity (C mol %) | | | |
|---|---|---|---|---|---|---|
| | | | $CH_4$ | $C_2$–$C_4$ | $C_5$–$C_9$ | $C_{10}$–$C_{20}$ |
| Example 1 | 10 | 20 | 29 | 24 | 28 | 19 |
| Example 2 | 10 | 7.7 | 22 | 23 | 35 | 20 |
| Example 3 | 20 | 50 | 19 | 17 | 35 | 29 |

As shown in Table 1, in each of Examples 1 to 3 it was possible to manufacture a hydrogenation product containing gasoline fuel oil components $C_5$ to $C_9$ and diesel fuel oil components $C_{10}$ to $C_{20}$ at relatively high selectivities.

Especially in Examples 2 and 3 each using a catalyst formed to carry cobalt by the TIE method, it was possible to manufacture hydrogenation products containing gasoline fuel oil components $C_5$ to $C_9$ and diesel fuel oil components $C_{10}$ to $C_{20}$ at higher selectivities. Also, in Example 3 using a catalyst formed to carry 20 wt % of cobalt by the TIE method, it was possible to manufacture a hydrogenation product containing gasoline fuel oil components $C_5$ to $C_9$ and diesel fuel oil components $C_{10}$ to $C_{20}$ at still higher selectivities.

EXAMPLE 4

First, a silica porous material in which 94% of all pores were fine pores each having a diameter of 1 to 8 nm was added to an aqueous ruthenium nitrate solution with a concentration of 10 wt %, and the silica porous material and the aqueous solution were mixed to exchange any residual surfactant (template) in the silica porous material with Ru ions. Subsequently, the mixture was dried and calcined at a temperature of 550° C. to remove the template by burning. By this TIE method, a powdery catalyst having an average grain size of 50 μm was manufactured. This catalyst carried 10 wt % of ruthenium, and the silica porous material maintained a fine structure before it carried ruthenium.

As in Example 1, the obtained powdery catalyst was packed into a cylindrical stainless-steel high-pressure reaction tube. This reaction tube was heated by a heater placed outside the reaction tube such that the internal temperature of the tube was 250° C. In this state, a high-pressure gas mixture (pressure; 2.0 MPa, $H_2$:Co=2:1) of hydrogen and carbon monoxide was supplied at a flow rate of 50 cm$^3$/min to manufacture a hydrogenation product from the exit of the reaction tube.

In Example 4, the conversion of the obtained hydrogenation product with respect to carbon monoxide (CO) in the gas mixture and the components of the hydrogenation product were examined following the same procedures as in Example 1.

Consequently, the CO conversion was 15%, and the selectivities of gasoline fuel oil components $C_5$ to $C_9$ and diesel fuel oil components $C_{10}$ to $C_{20}$ were 16% and 37%, respectively.

Note that even when a catalyst in which a silica porous material was made to carry ruthenium by the IMP method, instead of the TIE method, was used, the selectivities of gasoline fuel oil components $C_5$ to $C_9$ and diesel fuel oil components $C_{10}$ to $C_{20}$ were equivalent to those in Example 4.

Accordingly, a hydrogenation product manufactured by any of Examples 1 to 4 can be effectively used as fuel of a gasoline or diesel engine by a simple separating operation.

As has been described above, the present invention can provide a hydrogenation catalyst of carbon monoxide, which is suited to the manufacture of a hydrogenation product containing target components (e.g., gasoline fuel oil components or diesel fuel oil components) at high selectivity from a gas mixture of hydrogen and carbon monoxide.

Also, the present invention can provide a method of manufacturing a hydrogenation product, which contains target components (e.g., gasoline fuel oil components or diesel fuel oil components) at high selectivity from a gas mixture of hydrogen and carbon monoxide, and which can be used as fuel of a gasoline or diesel engine by a simple separating operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A catalyst for obtaining gasoline fuel oil components or diesel oil components by hydrogenation of carbon monoxide, comprising:

a transition metal; and a porous material carrying said transition metal, wherein said porous material consists primarily of silica, and said porous material has pores. 90% more of which are fine pores each halving a diameter of 1 to 50 nm.

2. A catalyst according to claim 1, wherein 90% or more of all pores in said porous material are fine pores each having a diameter of 1 to 10 nm.

3. A catalyst according to claim 1, wherein said transition metal is at least one metal selected from the group consisting of cobalt, nickel, iron, copper, chromium. manganese, zirconium, molybdenum, tungsten, rhienium, osmium, iridium, palladium, silver, ruthenium, rhodium, -old, and platinum.

4. A catalyst according to claim 1, wherein said transition metal is one metal selected from the group consisting of cobalt, iron, ruthenium, rhodium, and platinum.

5. A catalyst according to claim 1, wherein when said transition metal is one metal selected from the group consisting of cobalt and iron, said transition metal is carried within a range of 5 to 40 wt % by said porous material.

6. A catalyst according to claim 1, wherein when said transition metal is a noble metal selected from the group consisting of ruthenium, rhodium, and platinum, said noble metal is carried within a range of 1 to 15 wt % by said porous material.

7. A catalyst according to any one of claims 1 to 6, wherein said transition metal is carried by said porous material by adding a porous material containing a residual surfactant (template) to an aqueous solution of a transition metal compound and mixing said porous material and said aqueous solution to exchange transition metal ions with template ions, drying said porous material, and calcining said porous material to remove said template by burning.

8. A method of manufacturing a hydrogenation product, comprising reacting a gas mixture containing carbon monoxide and hydrogen at a temperature of 200 to 400° C. and a pressure of 0. to 10 MPa in the presence of a catalyst according to claim 1.

9. A method according to claim 8, wherein said hydrogenation product contains primarily gasoline fuel oil and diesel fuel oil.

* * * * *